United States Patent
Hirabayashi et al.

(10) Patent No.: US 12,521,945 B2
(45) Date of Patent: Jan. 13, 2026

(54) ROLLER UNIT FOR FEEDING TAPES, FIBER PLACEMENT APPARATUS AND METHOD OF MOLDING COMPOSITE MATERIAL

(71) Applicant: SUBARU CORPORATION, Tokyo (JP)

(72) Inventors: Daisuke Hirabayashi, Tokyo (JP); Daichi Terayama, Tokyo (JP); Shunya Nakanishi, Tokyo (JP); Tomoyoshi Kuniya, Tokyo (JP); Masami Komaniwa, Tokyo (JP); Shunsuke Ueno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 103 days.

(21) Appl. No.: 18/459,601

(22) Filed: Sep. 1, 2023

(65) Prior Publication Data
US 2024/0100786 A1    Mar. 28, 2024

(30) Foreign Application Priority Data
Sep. 26, 2022  (JP) .................................. 2022-153126

(51) Int. Cl.
*B29C 70/38*    (2006.01)
*B29K 105/08*   (2006.01)

(52) U.S. Cl.
CPC ........ *B29C 70/388* (2013.01); *B29K 2105/08* (2013.01)

(58) Field of Classification Search
CPC ..... B29C 70/38; B29C 70/382; B29C 70/384; B29C 70/386; B29C 70/388; B29K 2105/08
See application file for complete search history.

(56) References Cited

U.S. PATENT DOCUMENTS 8,893,758 B2    11/2014  Genssen
8,986,482 B2    3/2015   McCowin et al.
(Continued)

FOREIGN PATENT DOCUMENTS

FR      3100154 A1      7/2021
JP    2011-527648 A    11/2011
(Continued)

OTHER PUBLICATIONS

U.S. Appl. No. 18/459,578, Terayama, et al.
(Continued)

*Primary Examiner* — George R Koch
(74) *Attorney, Agent, or Firm* — Smith, Gambrell & Russell, LLP

(57) ABSTRACT

A roller unit aligns tapes in a width direction and feeds the tapes in a length direction while pressing the tapes in a thickness direction. The tapes are made of fibers which have not been impregnated with resin or have been impregnated with the resin. The roller unit includes rollers and a support shaft. The rollers rotate by friction force between the tapes and the rollers. The rollers are aligned so that rotation axes lie on a same straight line. Maximum diameters of the rollers are same as each other. The support shaft supports the rollers rotatably at rotational speeds independent from each other. Each of the rollers includes springs and thereby has elasticity. Length directions of the springs as well as expansion and contraction directions of the springs are radial directions of the each of the rollers. The springs are radially disposed inside the each of the rollers.

10 Claims, 10 Drawing Sheets

(56) References Cited

U.S. PATENT DOCUMENTS

| | | | |
|---|---|---|---|
| 9,003,619 | B2 | 4/2015 | Kawabe |
| 9,248,591 | B2 | 2/2016 | Caffiau et al. |
| 11,529,773 | B2 | 12/2022 | Takagi et al. |
| 11,548,241 | B2 | 1/2023 | Yasukochi et al. |
| 11,597,168 | B2 | 3/2023 | Kawabe et al. |
| 11,679,570 | B2 | 6/2023 | Hirabayashi et al. |
| 2002/0042332 | A1 | 4/2002 | Eronen |
| 2010/0263167 | A1* | 10/2010 | Fox .................. F16F 7/104 16/400 |
| 2012/0135227 | A1 | 5/2012 | Kawabe |
| 2014/0083620 | A1* | 3/2014 | Caffiau .............. B29C 70/388 156/433 |
| 2020/0055263 | A1 | 2/2020 | Takagi et al. |
| 2020/0190700 | A1 | 6/2020 | Yasukochi et al. |
| 2021/0206122 | A1 | 7/2021 | Kawabe et al. |
| 2022/0072813 | A1 | 3/2022 | Hirabayashi et al. |
| 2022/0266545 | A1 | 8/2022 | Hirabayashi et al. |
| 2022/0324185 | A1 | 10/2022 | Hamlyn |
| 2023/0226781 | A1 | 7/2023 | Takenaka |
| 2023/0241847 | A1 | 8/2023 | Kuniya |
| 2024/0100785 | A1* | 3/2024 | Terayama ............ B29C 70/384 |

FOREIGN PATENT DOCUMENTS

| | | |
|---|---|---|
| JP | 2014-519995 A | 8/2014 |
| JP | 2019-151726 A | 9/2019 |
| JP | 2020-059144 A | 4/2020 |
| JP | 2020-059145 A | 4/2020 |
| JP | 2020-093454 A | 6/2020 |
| JP | 2022-046379 A | 3/2022 |
| JP | 2022-130133 A | 9/2022 |
| JP | 2023-106261 A | 8/2023 |
| JP | 2023-111757 A | 8/2023 |
| WO | 2010/137525 A1 | 12/2010 |
| WO | 2018/168202 A1 | 9/2018 |

OTHER PUBLICATIONS

Extended European Search Report mailed Feb. 27, 2024 for European Patent Application No. 23195003.1 (7 pages) [European Counterpart of U.S. Appl. No. 18/459,578].

Extended European Search Report mailed Feb. 27, 2024 for European Patent Application No. 23197835.4 (7 pages) [European counterpart of U.S. Appl. No. 18/459,601].

Non Final Office Action mailed Dec. 19, 2024 in U.S. Appl. No. 18/459,578 (22 pages).

Final Office Action mailed Mar. 18, 2025 for U.S. Appl. No. 18/459,578 (52 pages).

Non Final Office Action mailed May 21, 2025 for U.S. Appl. No. 18/459,578 (74 pages).

* cited by examiner

ROLLER UNIT FOR FEEDING TAPES, FIBER PLACEMENT APPARATUS AND METHOD OF MOLDING COMPOSITE MATERIAL

CROSS REFERENCES TO RELATED APPLICATIONS

This application is based upon and claims the benefit of priority from Japanese Patent Application No. 2022-153126, filed on Sep. 26, 2022; the entire contents of which are incorporated herein by reference.

FIELD

Implementations described herein relate generally to a roller unit for feeding tapes, a fiber placement apparatus and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available (for example, refer to Japanese Patent Application Publication JP2014-519995A, International Publication WO2018/168202A and Japanese Patent Application Publication JP2019-151726A), and therefore a prepreg tape as well as a fiber tape, which has not been impregnated with resin, called a dry tape is also commercially available for lamination with an AFP apparatus.

When tape materials, such as prepreg tapes or dry tapes, are laminated with an AFP apparatus, laminating the tape materials simultaneously can improve the lamination efficiency, i.e., the length of the tape material laminated per unit time. Accordingly, an AFP apparatus having lamination heads is also devised so that tape materials can be laminated simultaneously (for example, refer to Japanese Patent Application Publication JP2011-527648A and Japanese Patent Application Publication JP2022-130133A). In addition, technique for adjusting an overlapped amount between adjacent prepreg tapes is also suggested for a multi-head type AFP apparatus for laminating prepreg tapes simultaneously (for example, refer to Japanese Patent Application Publication JP2020-059145A and Japanese Patent Application Publication JP2022-046379A).

However, the conventional AFP apparatus having lamination heads can laminate only tape materials each having a specific width. Therefore, in order to change the total width of laminated tape materials, the overlapped amounts among the tape materials have to be changed. In other words, the total width of laminated tape materials cannot be changed unless the tape materials are partially overlapped with each other. Accordingly, the thickness of laminated tape materials cannot be made uniform.

In addition, when prepreg tapes are overlapped with each other to be laminated, it may become difficult to laminate the prepreg tapes along a curved line since each prepreg tape has the viscosity. Specifically, when prepreg tapes are tried to be laminated along a curved line with overlapping the prepreg tapes with each other, the prepreg tapes may not be laid ideally since the length of a prepreg tape laminated on the inner side differs from that on the outer side. Accordingly, when prepreg tapes are overlapped with each other to be laminated, the prepreg tapes have to be laminated linearly or along a curved line whose curvature is very small.

This applies to a case where the width of the tape material itself is large. That is, in order to laminate tape materials along a curved line whose curvature is large, it is necessary to laminate tape materials whose widths are narrow without overlapping the tape materials with each other. The narrower the widths of tape materials are, the more the lamination efficiency of the tape materials decreases. Therefore, in order to avoid or reduce a decrease in the lamination efficiency, laminating more tape materials simultaneously is required.

However, a typical AFP apparatus has a lamination head composed of a brake for fixing a tape material, a feed roller for feeding out a tape material, a cutter for cutting a tape material, and a compaction roller for pushing a tape material on a mold. The widths of these components of the lamination head are each larger than the width of a tape material. Accordingly, lamination heads cannot be arrayed in the width direction of tape materials in order to avoid interference among the components. That is, lamination heads whose number is the same as that of tape materials have to be arranged at positions different from each other in the feeding direction of the tape materials like arranging the lamination heads alternately. As a result, feeding many tape materials simultaneously requires a large-scale AFP apparatus having many lamination heads, and therefore it is not easy to increase the number of tape materials.

Accordingly, an object of the present invention is to allow laminating tape materials, such as prepreg tapes or dry tapes, used as material of an FRP simultaneously without overlapping the tape materials with each other as well as to allow changing the total width of laminated tape materials.

Moreover, another object of the present invention is to allow laminating more tape materials by an AFP apparatus without a complicated and large-scale lamination head.

SUMMARY

In general, according to one implementation, a roller unit aligns tapes in a width direction and feeds the aligned tapes in a length direction while pressing the aligned tapes in a thickness direction. The tapes are made of fibers which have not been impregnated with resin or have been impregnated with the resin. The roller unit includes rollers and a support shaft. The rollers rotate by friction force between the tapes and the rollers when the rollers contact with the tapes. The rollers are aligned so that rotation axes of the rollers lie on a same straight line. Maximum diameters of the rollers are same as each other. The support shaft supports the rollers rotatably at rotational speeds independent from each other. Each of the rollers includes springs and thereby has elasticity. Length directions of the springs are radial directions of the each of the rollers. Expansion and contraction directions of the springs are radial directions of the each of the rollers. The springs are radially disposed inside the each of the rollers.

Further, according to one implementation, a fiber placement apparatus includes the above-mentioned roller unit for feeding the tapes.

Further, according to one implementation, a method of molding a composite material includes: laminating the tapes by feeding the tapes using the above-mentioned roller unit; and curing the resin with which the tapes have been impregnated.

DETAILED DESCRIPTION

A roller unit for feeding tapes, a fiber placement apparatus and a method of molding a composite material according to implementations of the present invention will be described with reference to accompanying drawings.
(First Implementation)
(Configuration and Functions of a Roller Unit for Feeding Tapes and a Fiber Placement Apparatus)

Figure 1:
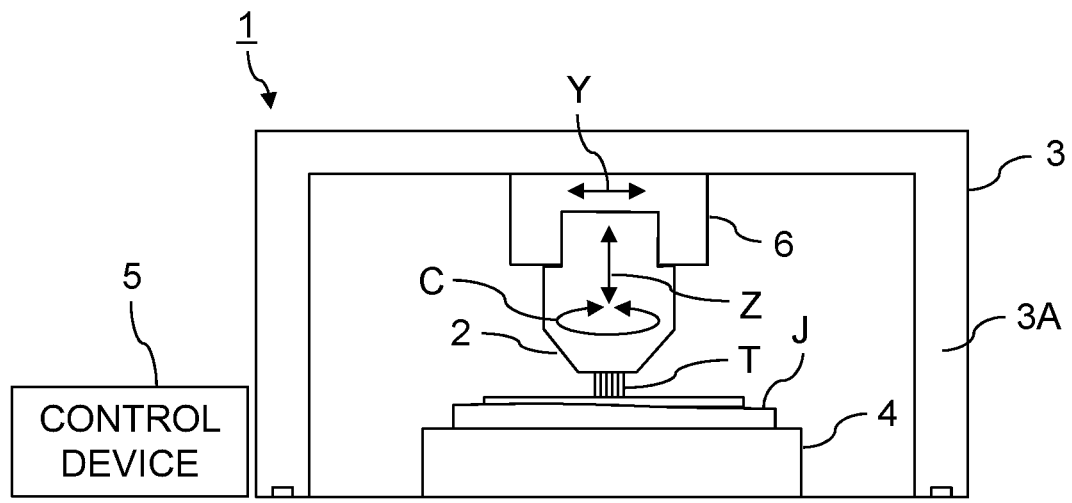
FIG. 1 is a front view showing overall schematic configuration of a fiber placement apparatus including a roller unit for feeding tapes according to the first implementation of the present invention.
Figure 2:
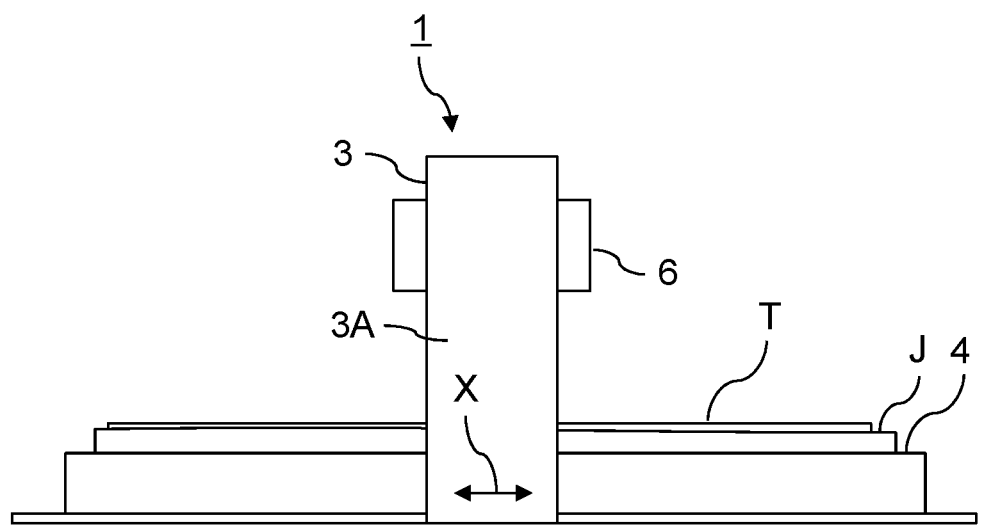
FIG. 2 is a side view of the fiber placement apparatus shown in FIG. 1.

FIG. 1 is a front view showing overall schematic configuration of a fiber placement apparatus 1 including a roller unit for feeding tapes according to the first implementation of the present invention. FIG. 2 is a side view of the fiber placement apparatus 1 shown in FIG. 1.

The fiber placement apparatus 1 produces a laminated body of prepreg tapes T, which are material of a composite material consisting of an FRP, by laminating the prepreg tapes T. The prepreg is sheet like fibers impregnated with thermoplastic resin or uncured thermosetting resin. The fiber placement apparatus 1 is an automatic lamination apparatus of prepregs, which produces a laminated body of the prepregs using material consisting of the rolled prepreg tapes T.

The fiber placement apparatus 1 can be composed of a lamination head 2, a gantry 3 suspending the lamination head 2, a table 4, and a control device 5. The lamination head 2 houses the prepreg tapes T inside, and feeds out the prepreg tapes T on the table 4 by discharging the prepreg tapes T. In particular, the lamination head 2 has a function to dispose the prepreg tapes T in parallel while feeding out the prepreg tapes T on the table 4. For that purpose, the lamination head 2 has creel stands of the prepreg tapes T.

The table 4 is a pedestal for laminating the prepreg tapes T. Although the prepreg tapes T may be directly laminated on the table 4, it is practical to place a lamination jig J, such as a shaping mold, on the table 4 so that the prepreg tapes T may be laminated on the lamination jig J, from a viewpoint of shaping a laminated body of the prepregs and cleaning. Therefore, the prepreg tapes T can be laminated on the table 4 directly or indirectly through the lamination jig J.

The gantry 3 includes a feed structure 6 which moves the lamination head 2 in a desired axis direction, besides supporting structures, such as supporting columns 3A, for supporting the lamination head 2. The feed structure 6 makes the lamination head 2 perform a feeding operation. That is, the feed structure 6 moves the lamination head 2 relatively to the table 4 so that the prepreg tapes T can be fed out toward the table 4 side while changing a lamination position. A feeding direction of the prepreg tapes T toward the table 4 side is opposite to a moving direction of the lamination head 2.

The feed structure 6 is configured to rotate the lamination head 2, in addition to typical linear movement of the lamination head 2. Therefore, the prepreg tapes T can be fed out linearly or along a curved line. In other words, a feeding direction of the prepreg tapes T can be changed. Note that, a component attached to the lamination head 2 may be rotated instead of rotating a casing itself of the lamination head 2.

In the example shown in FIG. 1 and FIG. 2, the feed structure 6 has been configured not only to move the lamination head 2 in parallel along three axis directions orthogonal to each other, including horizontal directions and the vertical direction consisting of X-axis, Y-axis and Z-axis, but to rotate the lamination head 2 along a C-axis direction whose rotation axis is the Z-axis in the vertical direction. As a matter of course, at least one tilt axis for inclining the lamination head 2 relative to the surface of the table 4 may be added. Moreover, the table 4 may be moved to the lamination head 2 by the feed structure 6 in addition to the movement of the lamination head 2, or instead of the movement of the lamination head 2.

The moving structure for linearly moving the lamination head 2 and/or the table 4 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement, for example. Alternatively, a moving structure may also be composed of at least one piston and hydraulic circuitry without using any motor.

Meanwhile, the rotating structure for rotating the lamination head 2 can be composed of at least one motor, such as an electric motor, a hydraulic motor or a pneumatic motor, and desired machine elements including a rotating shaft which rotates by power of the at least one motor, for example.

The control device 5 automatically controls the feed structure 6 and the lamination head 2. For example, NC (numerical control) of a spatial position and a rotational moving amount of the lamination head 2 relatively to the table 4 can be performed by controlling the feed structure 6. Moreover, the feeding of the prepreg tapes T from the lamination head 2 can be automatically started and ended as well as the prepreg tapes T can be automatically cut, by controlling the lamination head 2. Although the control device 5 may be built in or attached to the gantry 3, user interfaces, such as operation boards, and heavy components may be placed outside the gantry 3.

When NC control of the lamination head 2 is performed by the control device 5, the control device 5 can be composed of electronic circuitry, such as a computer, into which NC program has been read. Moreover, when the feed structure 6 is a hydraulic system or a pneumatic system, a part of the control device 5 can be composed by hydraulic circuitry or pneumatic circuitry.

Figure 3:
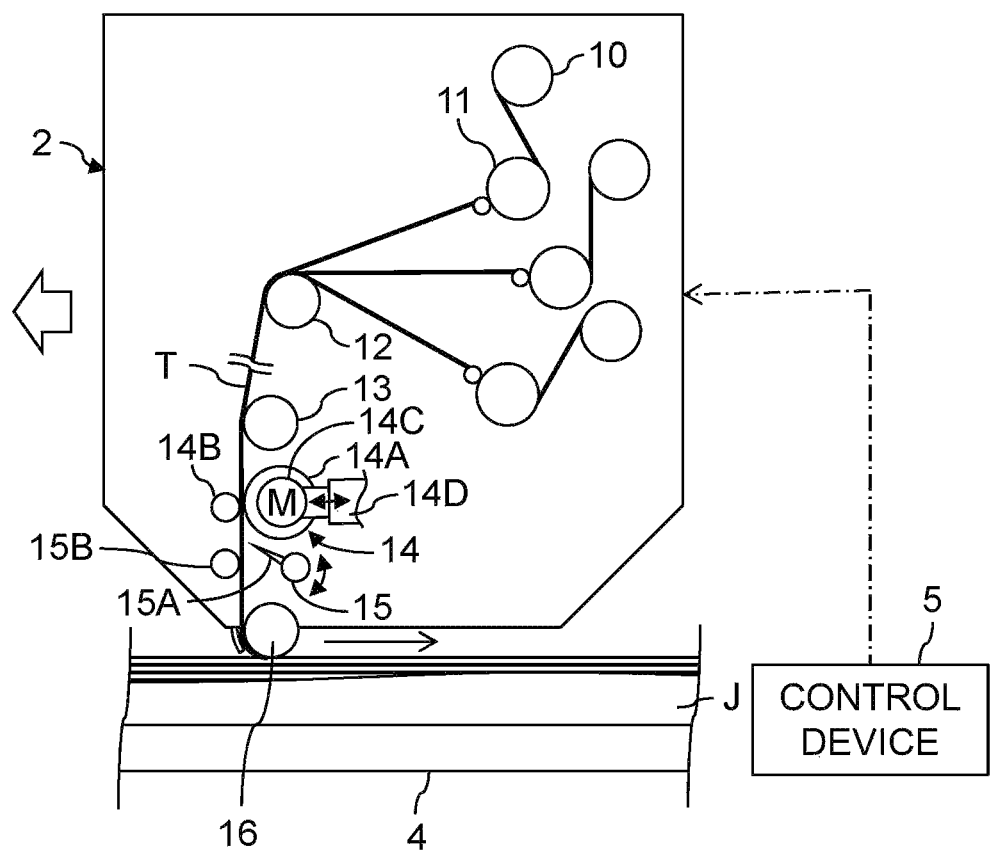
FIG. 3 is a side view showing an example of detailed structure inside and outside the laminating head shown in FIG. 1.

FIG. 3 is a side view showing an example of detailed structure inside and outside the lamination head 2 shown in FIG. 1.

As described above, the lamination head 2 has a function to align the prepreg tapes T in the width direction and feed out the aligned prepreg tapes T onto the table 4. For that purpose, the lamination head 2 can be provided with bobbins 10, width adjusting devices 11, an assembling roller 12, at least one tension roller 13, feed rollers 14, a cutter 15 and a compaction roller 16, as exemplified in FIG. 3.

Each of the bobbins 10 is a creel stand of the prepreg tape T having a constant width, and the prepreg tape T is wound on the bobbin 10. The bobbins 10 are provided as many as the number of the tapes T that can be fed out onto the table 4. The number of the tapes T to be fed out onto the table 4 may be decreased by resting or removing a part of the bobbins 10. The widths of the tapes T may be different from each other between the bobbins 10.

The width adjusting devices 11 are disposed in the rear stages of the bobbins 10 respectively, as required. Each of the width adjusting devices 11 changes the width of the tape T, supplied from the corresponding bobbin 10, to a desired width. For example, a device for narrowing the width of the tape T disclosed in Japanese Patent Application Publication JP2020-93454A may be used as the width adjusting device 11. Disposing the width adjusting device 11 makes it possible to supply the tape T, supplied from the corresponding bobbin 10, with changing the width of the tape T to a desired width. Conversely, when the width adjusting device 11 is not disposed, the tapes T having widths different from each other can also be supplied by replacing the bobbin 10 with another bobbin 10 corresponding to a different width of the tape T.

The width of the prepreg tape T for an aircraft is standardized in units of inches in many cases. It was confirmed by preform prototype tests that it was desirable to make each of the widths of the tapes T not more than ¼ inch (6.35 mm) from the viewpoint of securing the quality of a preform produced as a laminated body of the prepreg tapes T when steering lamination was performed in which the lamination head 2 was rotated to feed the prepreg tapes T onto the table 4 along a curved line, as described above. Accordingly, the bobbin 10 of the prepreg tape T having a width of ¼ inch or the bobbin 10 of the prepreg tape T having a width of ⅛ inch can be set regardless of whether the width adjusting device 11 is provided.

On the other hand, a standard prepreg tape T on the market has a thickness of 0.2 mm to 0.8 mm. A prepreg tape T having a thickness of 0.05 mm was used for preform prototype tests. Technically, it is considered possible to manufacture a thin prepreg tape T having a thickness of about 0.025 mm.

Each of the bobbin 10 and the width adjusting device 11 is provided with frames or wall surfaces for preventing the tape T from falling off. Accordingly, the widths of the bobbin 10 and the width adjusting device 11 are each wider than the width of the tape T. Therefore, in order to dispose the tapes T side by side without gaps, it is necessary to dispose the units, composed of the bobbins 10 and the width adjusting devices 11, for supplying each adjacent two tapes T, at different positions in the thickness directions of the tapes T as shown in FIG. 3 so that the interference between the units, composed of the bobbins 10 and the width adjusting devices 11, for supplying each adjacent two tapes T can be prevented. When the number of the tapes T is large, the units each composed of the bobbin 10 and the width adjusting device 11 may be disposed alternately. Alternatively, the prepreg tapes T may be twisted, and the units each composed of the bobbin 10 and the width adjusting device 11 may be disposed at positions where no interference arises.

The assembling roller 12 is a cylindrical roller for disposing and feeding the tapes T, fed out from positions different in the thickness directions of the tapes T, at a same position in the thickness directions of the tapes T. In other words, the assembling roller 12 is a cylindrical roller for arraying the tapes T, fed out in different directions, so that the length directions of the tapes T may become almost parallel to each other, and feeding out the arrayed tapes T in a same feeding direction.

When the width adjusting devices 11 are disposed in the fore stage of the assembling roller 12, the tapes T having different widths may be fed out to the assembling roller 12. Accordingly, when the interval between the central positions of each two tapes T adjacent in the width direction is made constant, the width of the gap between the edges of each two tapes T adjacent in the width direction may change. Therefore, the tape feeders disclosed in the application documents of Japanese Patent Application No. 2022-007499 may be disposed in the fore stage of the assembling roller 12 so that the interval between the central positions of each adjacent two tapes T can be adjusted according to the widths of the tapes T fed out from the width adjusting devices 11.

Each tension roller 13 is a cylindrical roller for preventing slack of the tapes T fed out in the same direction from the assembling roller 12 by applying tension to the tapes T. Tension can be applied to the tapes T by contacting the tension roller 13 with the tapes T so that the advancing direction of the tapes T may be changed.

The feed rollers 14 have power for feeding the tapes T, fed out in a same direction, in the length direction of the tapes T. The feed rollers 14 can be composed of a cylindrical power roller 14A, which is powered, and a cylindrical support roller 14B, which is not powered. The rotating shaft of the power roller 14A is coupled to the output shaft of a motor 14C. Accordingly, the power roller 14A is rotated by the power of the motor 14C. The support roller 14B is a roller for sandwiching the tapes T between the support roller 14B and the power roller 14A.

As a matter of course, both of the two rollers that sandwich the tapes T may be rotated by at least one motor. Gears and/or a one-way clutch may be coupled between the rotating shaft of the power roller 14A and the output shaft of the motor 14C.

The motor 14C for driving the feed rollers 14 can be controlled by the control device 5. Therefore, the start and end of feeding of the tapes T can be controlled by controlling the start and stop of rotation of the motor 14C.

The cutter 15 is a tool for cutting the tapes T when the tapes T fed out in a same direction have been laminated. The operation of the cutter 15 can be controlled by the control device 5.

Although the cutter 15 in the example shown in FIG. 3 is a rotary type in which the cutter 15 is rotated in order to contact a blade 15A of the cutter 15 with the tapes T, the cutter 15 may be moved in parallel in order to contact the blade 15A of the cutter 15 with the tapes T. Moreover, a cylindrical roller 15B may be disposed for sandwiching the tapes T between the roller 15B and the blade 15A of the cutter 15.

The compaction roller 16 is a cylindrical roller for feeding out the tapes T, fed out in a same direction, toward the table 4 while applying pressure to the tapes T in the thickness direction of the tapes T. The tapes T in the first ply are pressed on the lamination jig J by the compaction roller 16 while the tapes T in the second and subsequent plies are pressed on the lower laminated tapes T adjacent in the thickness direction. Therefore, the compaction roller 16 is a roller that feeds out the tapes T arrayed in the width direction while pressing the arrayed tapes T to the lamination jig J or the tapes T adjacent in the thickness direction.

As the number of the laminated tapes T increases, the height of the tapes T to be newly laminated gradually increases. Therefore, it is necessary to move the compaction roller 16 also in the vertical direction. The vertical position of the compaction roller 16 can be adjusted by moving the lamination head 2 vertically in parallel with the feed structure 6. Alternatively, a drive shaft may be provided for moving the compaction roller 16 up and down relatively to the lamination head 2.

Moving the compaction roller 16 so that the tapes T fed out in a same direction may be moved in a horizontal direction relatively to the table 4 allows feeding out the tapes T in a direction opposite to a moving direction of the compaction roller 16. In order to feed out the tapes T in a horizontal direction, it is necessary to dispose the compaction roller 16 so that the rotation axis of the compaction roller 16 may be horizontal. On the other hand, other rollers including the assembling roller 12 may each have a rotation axis inclined with respect to the horizontal direction in order to avoid interference or the like since the tapes T can be twisted.

After the ends of the tapes T reach the compaction roller 16, the tapes T can be fed out by the pressure applied from the compaction roller 16 without applying tension to the tapes T by the powered feed rollers 14. Then, the feeding speeds of the tapes T necessarily become the speeds of the tapes T fed out from the compaction roller 16 respectively. Therefore, after the ends of the tapes T reach the compaction roller 16, it is not preferable to apply excessive tension to the tapes T by the feed rollers 14 since the excessive tension by the feed rollers 14 causes slack or stretch of the tapes T.

Thus, the power roller 14A of the feed rollers 14 may be coupled to a cylinder mechanism 14D exemplified in FIG. 3 or another reciprocating mechanical element, such as a rack-and-pinion or a ball screw. Thereby, the power roller 14A can be retracted from the tapes T after the ends of the tapes T reach the compaction roller 16. Alternatively, the feed rollers 14 may be brought into contact with the tapes T in order to secure the tension of each tape T appropriately. In this case, each tape T is slid on the feed rollers 14.

Note that, a belt conveyor or a belt conveyor with a suction chuck disclosed in the application documents of Japanese Patent Application No. 2022-013771 may be used instead of the feed rollers 14 or in addition to the feed rollers 14.

When the compaction roller 16 is rotated together with the lamination head 2 relatively to the table 4 around the vertical rotation axis in order to feed out the prepreg tapes T, disposed in parallel in the width direction, from the compaction roller 16 onto the table 4 along a curved line, it is necessary to change the feeding speeds between the tapes T disposed in parallel in the width direction. As a result of the tests, it was found that the overlap of the prepreg tapes T, disposed in parallel in the width direction, with each other made it difficult to greatly change the feeding speeds between the tapes T due to the tack of the prepregs.

Therefore, in order to move the lamination head 2 along a curved trajectory having a curvature as large as possible, it is essential not only to use the tape T of not more than ¼ inch as described above, but also to prevent the tapes T to be fed out simultaneously from overlapping with each other in the width direction.

Note that, when the tapes T may be laminated with gaps thereamong, i.e., when the width of a lamination area is wider than the total width of the tapes T, the tapes T may be fed out from the compaction roller 16 with gaps thereamong. Hereinafter, a case of feeding out the tapes T from the compaction roller 16 without gaps and overlaps except for negligible gaps and overlaps will be described as an example.

When the tapes T arrayed in parallel without being overlapped with each other in the width direction are fed out from the compaction rollers 16 at different feeding speeds respectively, not only the tapes T to be fed out by the compaction roller 16 but also the tapes T to be fed out by each roller other than the compaction roller 16 are required to be fed out at feeding speeds different among the tapes T. That is, it is necessary to feed out the tapes T at feeding speeds independent from each other.

Thus, a roller unit allowing the tapes T to be fed out at independent feeding speeds respectively is used as each roller on which non-negligible frictional force is generated due to simultaneous and continuous contact with the tapes T also after the ends of the tapes T disposed in parallel without being overlapped with each other in the width direction reach the compaction roller 16 if the roller was a normal roller.

In the example shown in FIG. 3, at least the assembling roller 12, each tension roller 13 and the compaction roller 16 can each consist of the roller unit allowing the tapes T to be fed out at independent feeding speeds respectively. In addition, each of the cylindrical roller 15B, facing the blade 15A of the cutter 15, and the support roller 14B of the feed rollers 14 may also consist of the roller unit allowing the tapes T to be fed out at independent feeding speeds respectively as long as non-negligible frictional force is generated between the roller and the tapes T if the roller was a normal roller.

Figure 4:
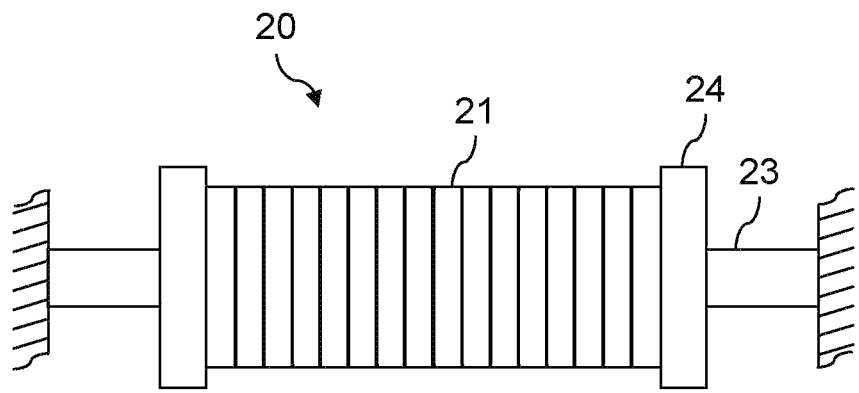
FIG. 4 is a front view showing structure of a roller unit for feeding tapes.
Figure 5:
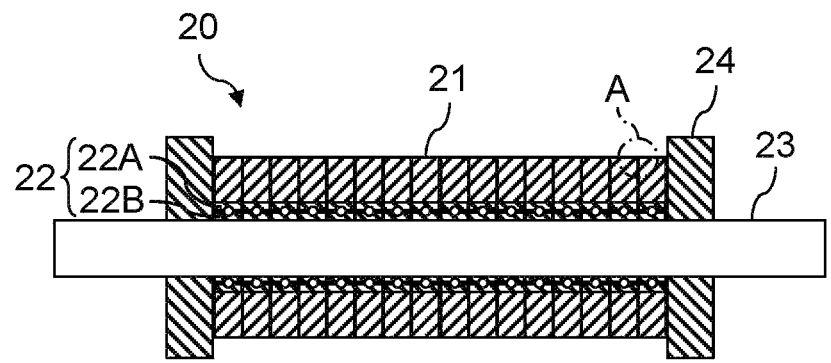
FIG. 5 is a longitudinal sectional view of the roller unit shown in FIG. 4.

FIG. 4 is a front view showing structure of a roller unit 20 for feeding tapes. FIG. 5 is a longitudinal sectional view of the roller unit 20 shown in FIG. 4.

The roller unit 20 for tape feeding can feed out the tapes T whose widths may be changed, at feeding speeds independent from each other in a state in which the tapes T are disposed without being overlapped with each other in the width direction. The roller unit 20 having such a function is a cylindrical roller composed of a plurality of sub rollers 21, a support shaft 23 and bearings 22. The sub rollers 21 are supported by the support shaft 23 through the bearings 22 respectively.

The sub rollers 21 have a same diameter and are disposed side by side so that the rotation axes of the sub rollers 21 may be on a same straight line. The inner surface of each sub roller 21 is fixed to an outer ring 22A of the corresponding bearing 22. That is, each sub roller 21 is supported by the bearing 22. Therefore, each sub roller 21 is rotated by the frictional force between the sub roller 21 and the tapes T. That is, no motor for directly giving torque to the sub rollers 21 is provided.

The support shaft 23 is a common shaft for supporting the sub rollers 21 rotatably at independent rotating speeds. The support shaft 23 itself is fixed not so as to rotate. An inner ring 22B of each bearing 22 is fixed to the support shaft 23. Thereby, each of the sub rollers 21 can be rotatably supported by the support shaft 23. In addition, ring detachment prevention plates 24 can be fixed to the support shaft 23 on both sides of the sub rollers 21.

Although it is also possible to rotatably support the cylindrical sub rollers 21 directly by the support shaft 23 without the bearings 22, in that case, the sub rollers 21 are rotated only by the frictional force between the tapes T and the sub rollers 21. Therefore, it is realistic to support the sub rollers 21 with the bearings 22 respectively from the viewpoint of avoiding insufficient lubrication between the sub rollers 21 and the support shaft 23.

It can also be said that the roller unit 20 configured in this way is a composite roller in which a plurality of rings are rotatably disposed to form a cylindrical shape. The outer surfaces of the sub-rollers 21 consisting of the rings may come into contact with the tapes T of which widths and the number are not always constant.

Therefore, the shape of each outer surface of the sub rollers 21 is determined to be flat on any longitudinal section of the roller unit 20 so that each tape T may not wrinkle unfavorably. For that purpose, what is necessary is just to form the shape of each outer surface of the sub rollers 21 as a cylindrical side surface without chamfering. In addition, all the sub rollers 21 are disposed so that no gap may be formed between any adjacent two outer surfaces of the sub rollers 21. That is, the shapes and arrangement of the sub rollers 21 are determined so that the shape derived by connecting the contours of the outer surfaces of all the sub rollers 21 with each other may become two parallel straight lines on any longitudinal section of the roller unit 20. Each sub roller 21 is made of a rigid body, such as a metal or a resin, so that the outer surface of the sub roller 21 may not be easily deformed.

In this case, each tape T can be brought into line contact with at least a part of the sub rollers 21 on a longitudinal section including the rotation axis of the roller unit 20 and the sub rollers 21 so as to be slidable in the direction of the rotation axis of the sub rollers 21. That is, each tape T can be slid on the sub rollers 21 in the rotation axis direction of the sub rollers 21.

The thickness of each sub roller 21 is determined to be thinner than any width of the tape T that may be supplied. In other words, the thickness of each sub roller 21 is determined so that each supplied tape T may always come into contact with at least two of the sub rollers 21 no matter what width each supplied tape T has. As a specific example, when the thickness of each sub roller 21 is 3 mm, each tape T can certainly be brought into contact with at least two of the sub rollers 21 whether the tapes T each having a width of ¼ inch (6.35 mm) are supplied or the tapes T each having a width of ⅛ inch (3.175 mm) are supplied.

When the thickness of each sub-roller 21 is made thinner than the width of the tape T, each tape T comes into contact with at least two of the sub rollers 21. In this case, each sub roller 21 rotates at a rotation speed determined by the frictional force between the roller 21 and the main tape T while sliding on another tape T in contact with the roller 21. Therefore, each sub roller 21 can be rotated at an independent rotating speed according to a feeding speed of the corresponding tape T. Conversely, the tapes T can be fed out at feeding speeds independent from each other using the sub rollers 21 rotatable at rotating speeds independent from each other.

That is, so long as each of the tapes T has a width wider than any of the thicknesses of the sub rollers 21, the tapes T can be fed out at independent feeding speeds by rotating at least two of the sub rollers 21 while being brought into line contact with at least three of the sub rollers 21, on a longitudinal section of the sub rollers 21 including the rotation axis of the sub rollers 21, slidably in the direction of the rotation axis of the sub rollers 21.

In case of the assembling roller 12 shown in FIG. 3, the tapes T come into contact with the assembling roller 12 at positions different in the circumferential direction of the assembling roller 12 while the tapes T separate from the assembling roller 12 at a same position in the circumferential direction of the assembling roller 12. Accordingly, when the roller unit 20 is the assembling roller 12, all the tapes T come into line contact with at least three of the sub rollers 21, on at least one longitudinal section of the sub rollers 21, slidably in the rotation axis direction of the sub rollers 21.

Decreasing the thickness of each sub roller 21 allows feeding out even the tapes T having narrower widths. Meanwhile, the thickness of each sub roller 21 must be not less than the thickness of the bearing 22. Therefore, determining the thickness of each sub roller 21 according to the thickness of the bearing 22, which is easily available, leads to the simplification of producing of the roller unit 20. From the viewpoint of securing the rigidity of each sub roller 21, it is considered realistic to make the thickness of each sub roller 21 not less than 1 mm.

The diameter of each sub roller 21 can be determined according to the thickness of the tape T and the devices disposed before and after the roller unit 20. Specifically, the thicker the prepreg tape T is, the more difficult it becomes to bend the tape T in the thickness direction, and therefore the more it becomes necessary to increase the diameter of each sub roller 21. For example, the prepreg tape T having a thickness of 0.05 mm can be sufficiently curved even with the sub rollers 21 each having a diameter of 20 mm.

Figure 6:
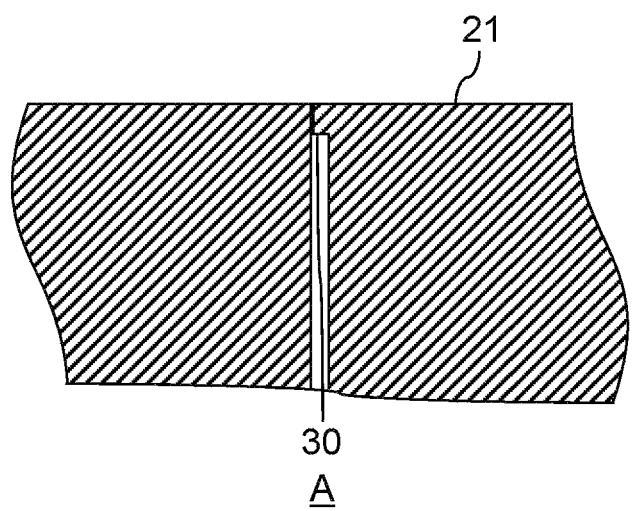
FIG. 6 is an enlarged view at the position A of the sub rollers shown in FIG. 5.

FIG. 6 is an enlarged view at the position A of the sub rollers 21 shown in FIG. 5.

When the end faces of adjacent sub rollers 21 come into contact with each other, undesirable frictional force is generated. Accordingly, a step 30 can be formed in each sub roller 21 so that the area of one end face of each sub roller 21, which may come into contact with the end face of the adjacent sub roller 21, may be reduced, as exemplified in FIG. 6. More specifically, the radial step 30 can be formed in each of the sub rollers 21 so that the thickness of each sub roller 21 may decrease toward the bearing 22 while keeping the shape of the outer surface of each sub roller 21 from changing, as exemplified in FIG. 6.

In this case, an annular end face having a narrow width is formed in each sub roller 21, and thereby the contact area between the end faces of each adjacent sub rollers 21 can be reduced. As a result, it is possible to reduce generation of useless frictional force due to rotation of the sub rollers 21 disposed without gaps at independent rotation speeds.

If the height difference of the step 30 is increased, the thickness of the sub roller 21 is decreased, which causes reduction in rigidity. Therefore, the height of each step 30 is preferably made the minimum height that can avoid the generation of non-negligible frictional force. The closer each step 30 is made to the outer surface of the sub roller 21, the narrower the width of the annular end face of each sub roller 21 becomes, and the greater the effect of reducing the frictional force becomes. Accordingly, for example, the height of each step 30 can be made about 0.1 mm while the width of each annular end face can be made about 0.2 mm.

As long as the step 30 is formed on one of the two end faces of each adjacent sub rollers 21, the contact area between the end faces is reduced. Therefore, it is not necessary to form the step 30 on both of the two end faces that may come into contact with each other. That is, the effect of reducing the frictional force between each adjacent sub rollers 21 can be obtained by forming the step 30 only on one end face of each sub roller 21 except for one of the two sub rollers 21 at both ends adjacent to the ring detachment prevention plates 24. Meanwhile, it is desirable to form the step 30 also in each of the sub rollers 21 adjacent to the ring detachment prevention plates 24 in order to reduce the frictional force between the ring detachment prevention plate 24 and the sub roller 21, except for a case where a gap is generated between the ring detachment prevention plate 24 and the sub roller 21 due to the placement of an O-ring or the like.

Figure 7:
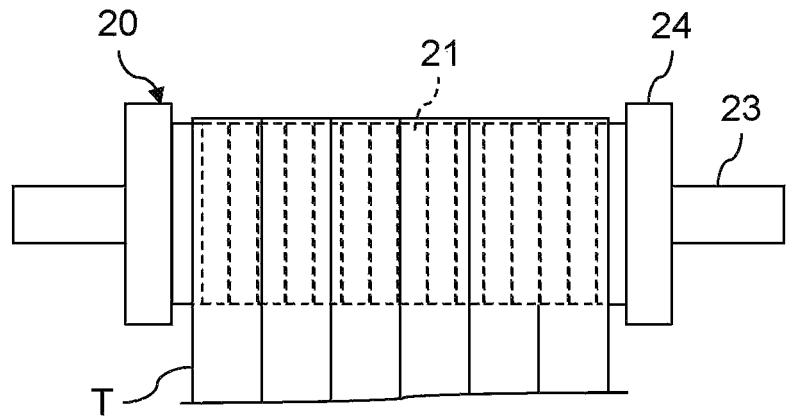
FIG. 7 shows an example of feeding out wide prepreg tapes by the roller unit shown in FIG. 4.
Figure 8:
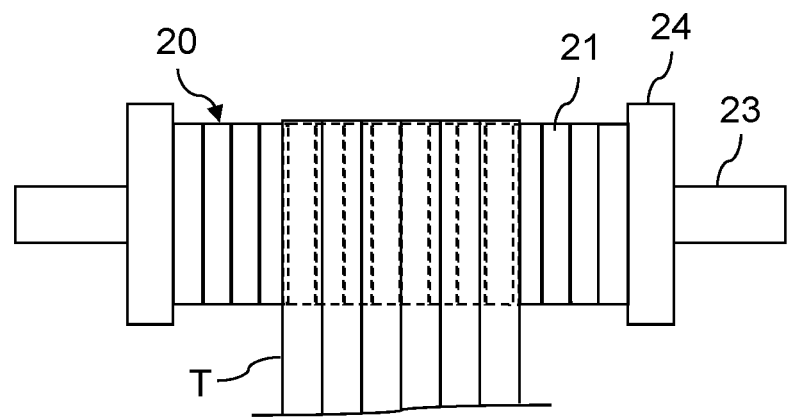
FIG. 8 shows an example of feeding out narrow prepreg tapes by the roller unit shown in FIG. 4.
Figure 9:
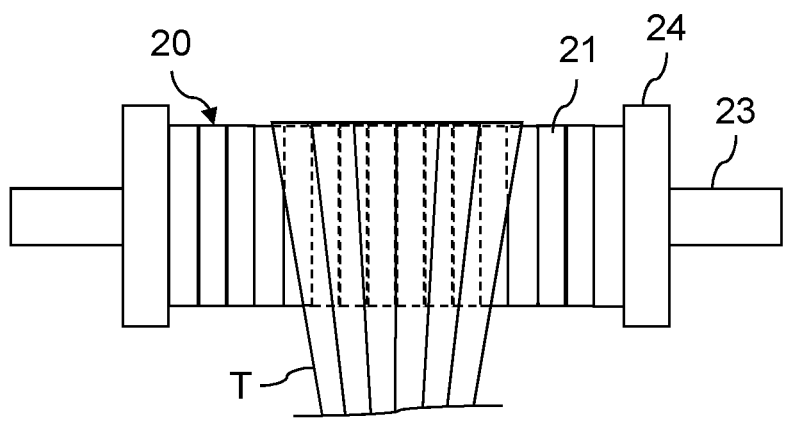
FIG. 9 shows an example of feeding out prepreg tapes, each having a varying width, by the roller unit shown in FIG. 4.

FIG. 7 shows an example of feeding out wide prepreg tapes T by the roller unit 20 shown in FIG. 4. FIG. 8 shows an example of feeding out narrow prepreg tapes T by the roller unit 20 shown in FIG. 4. FIG. 9 shows an example of feeding out prepreg tapes T, each having a varying width, by the roller unit 20 shown in FIG. 4.

As described above, the tapes T, having different widths, disposed in parallel in the width direction can be fed out from the roller unit 20. Accordingly, when the wide tapes T are supplied to the roller unit 20, the tapes T having a wide total width can be fed out as exemplified in FIG. 7. Conversely, when the narrow tapes T are supplied to the roller unit 20, the tapes T having a narrow total width can be fed out as exemplified in FIG. 8. Alternatively, when the tapes T are supplied to the roller unit 20 while varying the widths by the width adjusting devices 11 respectively, the tapes T having a varying total width can be fed out as exemplified in FIG. 9.

Figure 10:
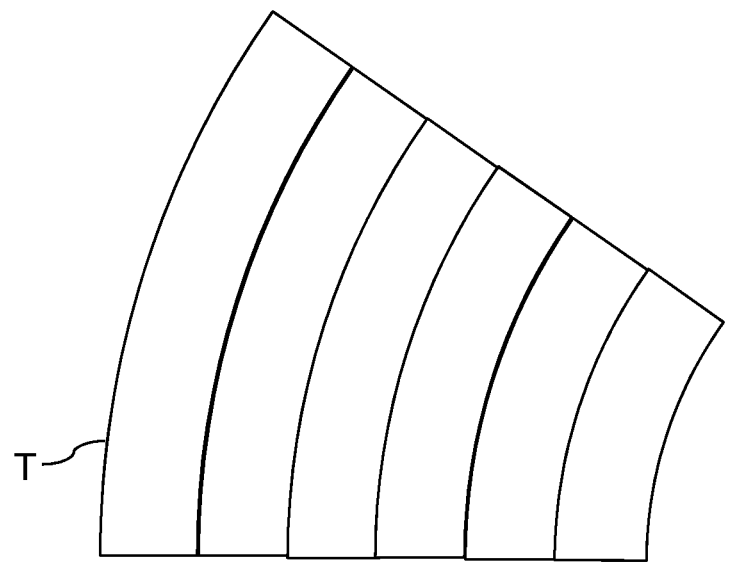
FIG. 10 shows an example of prepreg tapes that can be laminated by the fiber placement apparatus having the roller unit shown in FIG. 4.
Figure 11:
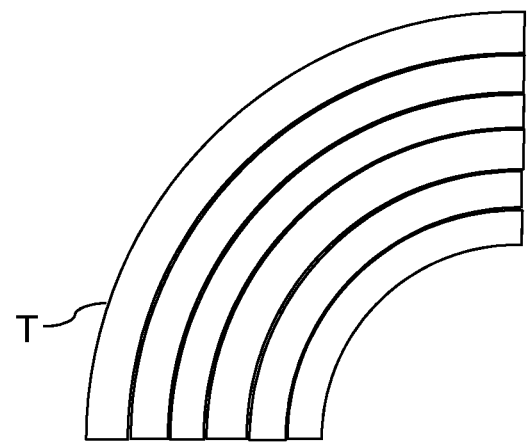
FIG. 11 shows another example of prepreg tapes that can be laminated by the fiber placement apparatus having the roller unit shown in FIG. 4.

FIG. 10 shows an example of prepreg tapes T that can be laminated by the fiber placement apparatus 1 having the roller unit 20 shown in FIG. 4. FIG. 11 shows another example of prepreg tapes T that can be laminated by the fiber placement apparatus 1 having the roller unit 20 shown in FIG. 4.

When the lamination head 2 is horizontally moved relatively to the table 4 while rotating the lamination head 2 around a vertical rotation axis, the tapes T arrayed in the width direction can be fed out and laminated along a curved line as exemplified in FIG. 10. When the tapes T are laminated along a curved line, the lengths of the tapes T fed out per unit time are different from each other as exemplified in FIG. 10. In this case, the tapes T can be fed out at independent feeding speeds as long as the tapes T are fed out by the roller unit 20. Therefore, it is possible to prevent a problem that a part of the tapes T is displaced and overlaps.

When the narrow tapes T are fed out, the tapes T can be laminated along a curved line, having a larger curvature, as exemplified in FIG. 11. Conversely, when the wide tapes T are used as exemplified in FIG. 10, the lamination area of the tapes T per unit time can be increased. Therefore, the tapes T having appropriate widths can be used according to a shape of an FRP to be molded.

(A Method of Molding a Composite Material)

Next, a method of molding a composite material, consisting of an FRP, using the fiber placement apparatus 1 having the roller units 20 for tape feeding will be described.

In order to mold an FRP, a preform having a shape corresponding to a shape of the FRP after molding is first produced by laminating and shaping prepreg tapes T. For that purpose, the lamination jig J, having a simple shape, for laminating the prepreg tapes T as well as a shaping jig, having a complicated shape, for shaping a laminated body of the prepreg tapes T may be prepared separately. In this case, the laminated body of the prepreg tapes T laminated on the lamination jig J is transferred on the shaping jig and then shaped. Alternatively, the lamination jig J itself may be also used as the shaping jig.

The operation of laminating the prepreg tapes T on the lamination jig J is performed by the fiber placement apparatus 1 having the roller units 20 for tape feeding exemplified in FIG. 1 to FIG. 6. For that purpose, a control program for the fiber placement apparatus 1 for automatically laminating the prepreg tapes T is read into the control device 5. Meanwhile, the bobbins 10 wound with the prepreg tapes T having widths used for the lamination are set on the lamination head 2. At this time, the respective end portions of the tapes T are sandwiched between the power roller 14A and the support roller 14B included in the feed rollers 14.

When the fiber placement apparatus 1 is operated under the control of the control device 5, the motor 14C for the feed rollers 14 is driven and thereby the power roller 14A is rotated. As a result, the end portions of the tapes T are fed out at a same feeding speed. That is, the tapes T passing through the width adjusting devices 11, the assembling roller 12 and the at least one tension roller 13 from the bobbins 10 are fed out at a same feeding speed.

When the end portions of the tapes T reach the surface of the lamination jig J, the feed structure 6 is driven under the integrated control by the control device 5, and thereby the lamination head 2 is moved in the direction opposite to a feeding direction of the tapes T. As a result, the compaction roller 16 is moved relatively to the lamination jig J in the direction opposite to the feeding direction of the tapes T, and eventually the end portions of the tapes T are sandwiched between the compaction roller 16 and the lamination jig J. That is, the end portions of the tapes T reach the compaction roller 16.

Then, the cylinder mechanism 14D is driven under the integrated control by the control device 5, and thereby the power roller 14A is retracted from the tapes T. Accordingly, when the lamination head 2 is continuously moved in the direction opposite to the feeding direction of the tapes T, the tapes T are fed in the feeding direction. The feeding speed of the tapes T becomes a speed of the tapes T being fed out while receiving pressure from the compaction roller 16, i.e., a relative speed of the table 4 and the lamination jig J to the compaction roller 16 and the lamination head 2.

After that, prepregs in the first ply can be laminated on the lamination jig J by moving the lamination head 2 along paths defined by the control program. When the tapes T are linearly fed out by moving the lamination head 2 linearly, the feeding speeds of the tapes T are the same as each other. On the other hand, when the tapes T are fed out along a curved line as exemplified in FIG. 10 and FIG. 11, the feeding speeds of the tapes T are not the same as each other.

Each of the rollers, including the assembling roller 12 and the at least one tension roller 13, used for feeding out the tapes T consists of the roller unit 20, as exemplified in FIG. 4 to FIG. 6, which allows the tapes T to be fed out at independent feeding speeds. Accordingly, even when a path of the lamination head 2 is a curved line having a small curvature as well as a curved line having a large curvature, the tapes T can be laminated along a target path without misalignment of the tapes T, as exemplified in FIG. 10 and FIG. 11.

In addition, each of the roller units 20, including the assembling roller 12 and the at least one tension roller 13, used for feeding out the tapes T can feed out the tapes T while sliding the tapes T in the width direction. Accordingly, the width adjusting devices 11 can be controlled by the control device 5 according to prepreg lamination conditions, and the tapes T can be fed out by the roller units 20 while continuously changing the widths of the tapes T by the width adjusting devices 11 as exemplified in FIG. 9.

Moreover, the width adjusting devices 11 may also be controlled by the control device 5 so that the widths of the tapes T fed out by the roller units 20 may be intermittently changed by the width adjusting devices 11 according to lamination conditions, such as a rotation radius of the lamination head 2 and widths of prepregs after lamination, as exemplified in FIG. 7 and FIG. 8. In other words, it is possible to define various conditions for laminating the tapes T in the control program.

When the lamination head 2 reaches a lamination end position in the first ply, the cutter 15 is driven under the integrated control by the control device 5, and thereby the tapes T are cut. Subsequently, the feed structure 6 is driven under the integrated control by the control device 5, and thereby the lamination head 2 is moved to a lamination start position in the second ply. Then, lamination of the tapes T in the second ply can be started similarly to that in the first ply. Thus, when lamination of all the plies is completed, a laminated body of prepregs is produced. Note that, when a certain ply is divided into a plurality of lamination areas and/or when the widths of the tapes T are varied discontinuously, cutting of the tapes T and resuming of lamination can be performed during lamination of a same ply.

When an FRP to be produced has a complicated shape like an aircraft part having a curved web and flange, it may be necessary to give the laminated body of the prepregs, placed on the lamination jig J, a shape corresponding to the shape of the FRP. In such a case, following the prepreg lamination process, a shaping process is performed to give the shape to the laminated body of the prepregs.

The laminated body of the prepregs can be shaped by heating with a heating device and pressurization. The pressurization can be performed by pressing a shaping mold to the laminated body of the prepregs with a pressing machine or applying atmospheric pressure to the laminated body of the prepregs by bagging. When the lamination jig J does not serve as a shaping mold, as described above, the laminated body of the prepregs is transferred from the lamination jig J on a shaping mold. Conversely, when the lamination jig J also serves as a shaping mold, the lamination jig J on which the laminated body of the prepregs is placed is transported to an area for carrying out the shaping process by bagging, a pressing machine, or the like.

When the shaping of the laminated body of the prepregs is completed, a preform having a shape corresponding to the shape of the FRP after molding is produced. Note that, in a case where the FRP has a simple shape like an aircraft panel, and therefore the preform can be produced only by laminating the prepreg tapes T on the lamination jig J having a shape for the shaping, the lamination and the shaping of the prepregs are performed at the same time.

Once the preform is produced, the resin included in the preform is cured. That is, a curing process of the resin with which the laminated and shaped prepreg tapes T is previously impregnated is performed. Thereby, the FRP having a target shape can be molded.

When the resin is a thermosetting resin, the curing process of the resin is performed by heating the resin using a heating device, such as an oven or an autoclave apparatus. On the other hand, when the resin is a thermoplastic resin, the curing process of the resin is performed by heating and melting the resin once with a heating device, and then cooling the resin by air cooling or the like. In addition, an assembly process for combining the preform with at least one other preform and/or at least one other intermediately cured FRP as well as placing at least one other dry preform to be molded by the RTM method on the preform, and subsequent injection of resin into the at least one dry preform may also be performed prior to curing the resin.

The lamination jig J or the shaping jig may be used as a molding jig for molding the FRP by curing the resin included in the preform. Alternatively, a molding jig may be prepared separately, and the preform may be transferred from the lamination jig J or the shaping jig to the molding jig.

(Effects)

As described above, in the roller unit 20 for tape feeding, the fiber placement apparatus 1, and the method of molding a composite material, prepreg tapes T disposed in parallel so as not to overlap with each other in the width direction are laminated by being fed out by the sub rollers 21, having a same diameter, rotatably supported by the support shaft 23.

Thus, according to the roller unit 20 for tape feeding, the fiber placement apparatus 1, and the method of molding a composite material, a plurality of prepreg tapes T can be laminated simultaneously without overlapping with each other. In addition, the total width of the tapes T to be laminated can be changed by feeding out prepreg tapes T having different widths and/or changing the number of prepreg tapes T to be fed out.

Figure 12:
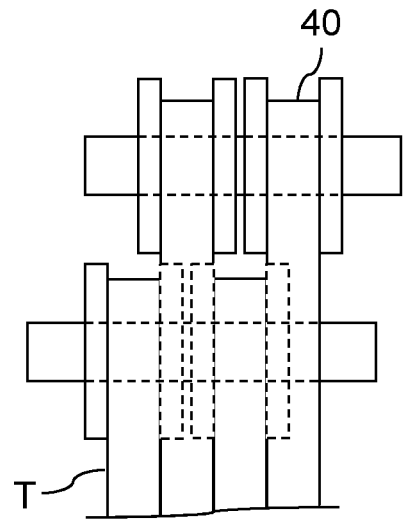
FIG. 12 is a view for explaining a problem in a conventional AFP apparatus that feeds out prepreg tapes using separate type rollers disposed alternately.

FIG. 12 is a view for explaining a problem in a conventional AFP apparatus that feeds out prepreg tapes T using separate type rollers 40 disposed alternately.

When the prepreg tapes T are fed out with the separate type rollers 40 disposed alternately as shown in FIG. 12, it is not easy to change the width of each tape T although each tape T can be fed out at an independent feed speed. In addition, if tapes T with narrow widths are to be fed out, gaps arise among the tapes T. In order to eliminate the gaps among the tapes T, it is required to prepare complicated mechanisms for respectively moving the separate type rollers 40 in the rotation axis direction.

For this reason, in order to increase the number of the tapes T, it is necessary to increase not only the number of the separate type rollers 40 but also the number of the complicated mechanisms for respectively moving the separate type rollers 40 in the rotation axis direction, which causes a problem that the number of the tapes T cannot be increased unless the lamination head is made very large.

On the other hand, when the above-mentioned roller unit 20 is used, each tape T can slide on the sub rollers 21 in the width direction of the tape T. Therefore, gaps between the tapes T can be eliminated or adjusted without complicated mechanisms even when the tapes T to be fed out have different widths. In addition, the number of the tapes T that can be fed out can be easily increased only by increasing the number of the sub rollers 21. That is, it becomes possible to laminate more tapes T simultaneously using a substantially single cylindrical roller without making the lamination head 2 complicated and large-scale.

Figure 13:
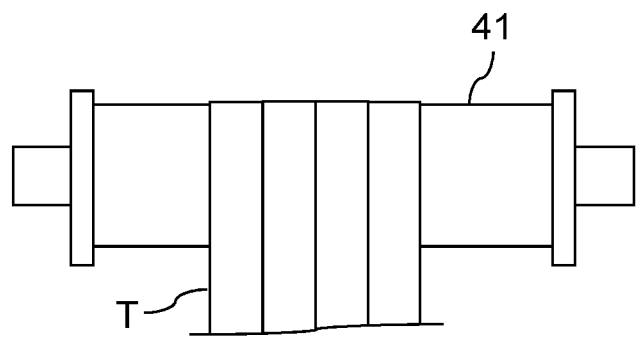
FIG. 13 is a view for explaining a problem in a conventional AFP apparatus that feeds out prepreg tapes using a common single roller.

FIG. 13 is a view for explaining a problem in a conventional AFP apparatus that feeds out prepreg tapes T using a common single roller 41.

When the prepreg tapes T are fed out by the common single roller 41, as shown in FIG. 13, each tape T cannot be fed out at an independent feeding speed. As a result, there is a problem that the tapes T may be laminated in a state of being shifted and overlapped when it is attempted to laminate the tapes T along a curved line with a large curvature.

Note that, tests were conducted with coating the surface of the single roller 41 to reduce the friction between the single roller 41 and the tapes T. As a result, it became clear that each tape T might not be fed out at an independent feeding speed due to insufficient reduction effect of the friction force.

On the other hand, when the above-mentioned roller unit 20 is used, each tape T can be fed out at an independent feeding speed since each sub roller 21 can rotate at an independent rotational speed. As a result, it becomes possible to laminate the tapes T easily along a curved line as exemplified in FIG. 10 and FIG. 11 using a substantially single cylindrical roller regardless of whether the curved line has a large curvature or a small curvature. That is, it is possible to avoid a situation in which an excess tape T on the inner ring side has no place to go and thereby deviates from a pathway, which allows steering lamination of the tapes T with stable quality and accuracy.

(Second Implementation)

Figure 14:
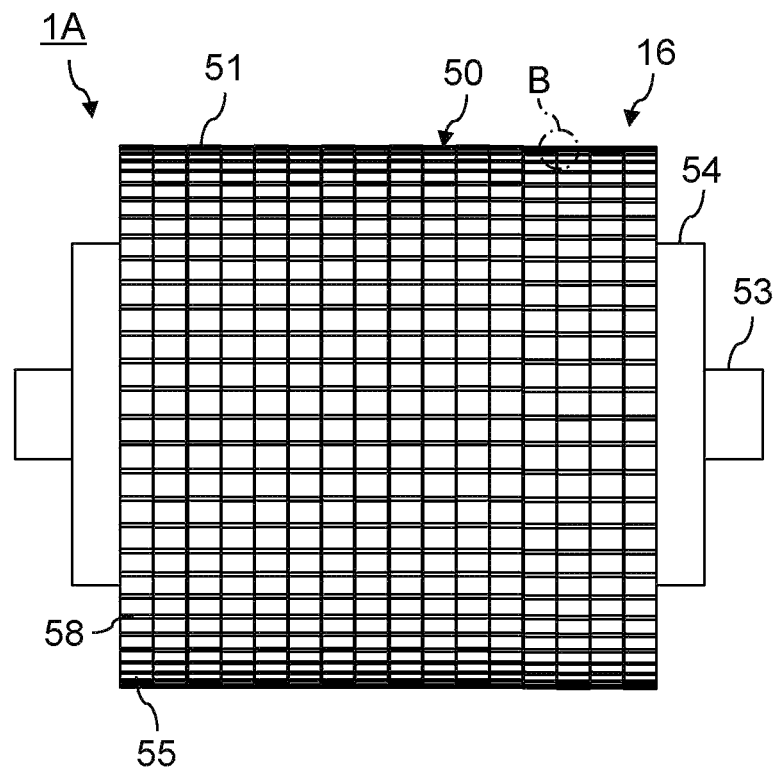
FIG. 14 is a front view of a roller unit for feeding tapes included in a fiber placement apparatus according to the second implementation of the present invention.
Figure 15:
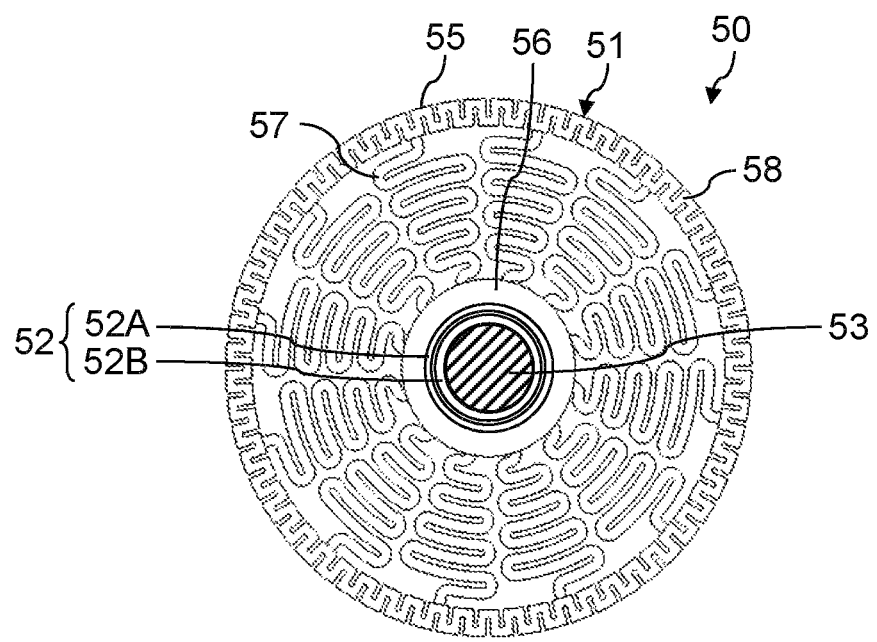
FIG. 15 is a left side view of each sub roller included in the roller unit shown in FIG. 14.

FIG. 14 is a front view of a roller unit 50 for feeding tapes included in a fiber placement apparatus 1A according to the second implementation of the present invention. FIG. 15 is a left side view of each sub roller 51 included in the roller unit 50 shown in FIG. 14.

The fiber placement apparatus 1A in the second implementation shown in FIG. 14 and FIG. 15 differs from the fiber placement apparatus 1 in the first implementation in structure of the roller unit 50 for tape feeding used as the compaction roller 16. Other configurations and actions of the fiber placement apparatus 1A in the second implementation are not substantially different from those of the fiber placement apparatus 1 in the first implementation. Accordingly, only the roller unit 50 is illustrated, and the same elements and the corresponding elements are given the same reference signs while the explanation thereof is omitted.

The compaction roller 16 not only feeds out the tapes T, but also applies pressure to the tapes T in the thickness direction. That is, the compaction roller 16 is a roller for disposing the tapes T in the width direction and then feeding out the tapes T in the length direction while pressing the tapes T in the thickness direction.

The lamination jig J on which the tapes T are to be laminated may serve as a lower mold for shaping a preform, and therefore does not necessarily have a flat surface. Even when the lamination jig J has a flat surface, a non-flat surface may be formed by the tapes T laminated below in case of changing the lengths and/or paths of the tapes T for each ply. Therefore, the tapes T laminated below the tapes T to be fed out from the compaction roller 16 do not necessarily form a flat surface. That is, it may be necessary to press the tapes T onto a curved or uneven surface with the compaction roller 16.

Accordingly, not only the roller unit 50 used as the compaction roller 16 can consist of a cylindrical roller composed of the sub rollers 51, bearings 52 and a support shaft 53, which supports the sub rollers 51 via the bearings 52, but also elasticity can be given to each sub roller 51. That is, not only the roller unit 50 can feed out the tapes T at independent feeding speeds in a state that the tapes T whose widths may be changed are aligned without overlapping with each other in the width direction, but also the roller unit 50 has elasticity.

The configuration of the roller unit 50 is generally similar to that of the roller unit 20 shown in FIG. 4 and FIG. 5, except for the structure and elasticity of each sub roller 51. That is, the roller unit 50 for the compaction roller 16 is a roller obtained by replacing the rigid sub rollers 21 of the roller unit 20 shown in FIG. 4 and FIG. 5 with the elastic sub rollers 51 respectively. Note that, it is necessary to make the diameter of each ring detachment prevention plate 54 fixed to the support shaft 53 smaller than the diameter of each sub roller 51 so that the roller unit 50 can apply pressure to the tapes T in the thickness direction.

Each sub roller 51 has an outer ring 55, an inner ring 56 and first springs 57. The outer ring 55 is coupled to the inner ring 56 with the first springs 57 as exemplified in FIG. 15. That is, the first springs 57 are disposed inside each sub roller 51. The outer ring 55 is a ring-shaped member that forms the outer surface of the sub roller 51. On the other hand, the inner ring 56 is a ring-shaped member for fixing the sub roller 51 to an outer ring 52A of the bearing 52. An inner ring 52B of the bearing 52 is fixed to the support shaft 53. Thereby, the sub rollers 51 can be supported rotatably at mutually independent rotating speeds by the support shaft 53.

Note that, since the compaction roller 16 rotates while pressing the tapes T to be fed out against the table 4 or the tapes T already laminated below unlike the assembling roller 12 and the tension roller 13, the bearings 52 may be omitted and the sub rollers 51 may be each rotated by tolerance adjustment, such as clearance fitting. That is, the inner ring 56 of each sub roller 51 may be directly rotatably supported by the support shaft 53. Nevertheless, it is desirable to support the sub rollers 51 with the bearings 52 respectively from the viewpoint of avoiding the risk of rotational failure when the pressure applied to the tapes T by the compaction roller 16 becomes small.

The first springs 57 are radially disposed inside the outer ring 55 so that the length directions and the expansion/contraction directions may be the radial directions of the sub roller 51. That is, the first springs 57 which expand and contract in the rotation radial directions of the roller unit 50 are built in the roller unit 50. As a result, the outer surface of each sub roller 51 supported from the inside by the first springs 57 as well as the outer surface of the roller unit 50 can be given elasticity in the rotation radial directions.

The thickness of each sub roller 51 is determined to be thinner than the width of each tape T so that each tape T can be fed out at an independent feeding speed, similarly to each sub roller 21 of the roller unit 20 shown in FIG. 4 and FIG. 5. As mentioned above, it is realistic to use the tapes T each having a width of not more than ¼ inch (6.35 mm) in order to stably perform steering lamination of the tapes T. Therefore, the thickness of each sub roller 51 is about 1 mm to 6 mm.

In order to dispose the first springs 57 in the space, having such a thickness, formed between the outer ring 55 and the inner ring 56 of each sub roller 51, it is also necessary to reduce the thickness of each first spring 57 in the rotation axis direction of the sub roller 51. Therefore, it is practical to use a one-dimensional wavy spring whose phase direction is a radial direction of the sub roller 51 while amplitude direction is perpendicular to both the radial direction and the rotation axis direction of the sub roller 51, as each of the first springs 57 disposed radially, as exemplified in FIG. 15, instead of using a typical coil spring. In addition, since the space inside which the first springs 57 are disposed becomes wider as the distance from the center of rotation of the sub roller 51 in each radial direction of the sub roller 51 increases, increasing the amplitude of the wave-shaped first spring 57 as the distance from the center of rotation of the sub roller 51 increases leads to an effective use of the space.

The diameter of each sub roller 51 can be determined not only so as to accommodate the radially disposed first springs 57, but also in relation to parts related to the compaction roller 16. Note that, the roller unit 50 having the sub rollers 51 whose diameters are each 50 mm was prototyped.

It is appropriate to decide each spring constant of the first springs 57 so that the compaction roller 16 can stably press the prepreg tapes T with an appropriate pressure while following a shape of a surface on which the tapes T are to be laminated even when the surface is curved or uneven. If the first spring 57 having a one-dimensional waveform is made of a metal, there is a high possibility that the metal will be plastically deformed. On the other hand, if the first spring 57 having a one-dimensional waveform is made of rubber, there is a high possibility that the spring constant will be too small.

Thus, the first spring 57 having a one-dimensional waveform can be made of a resin, such as a polyamide or an ABS resin, other than rubber. Note that, the sub roller 51 having the first springs 57 was actually produced as a prototype using polyamide 12 which was easily available. As a result, it was confirmed that the target elasticity was obtained. Nevertheless, a metal or rubber may be used as long as a desired spring constant can be stably obtained.

On the other hand, the outer ring 55 supported from the inside by the first springs 57 is also preferably made of an elastic body having sufficient elasticity. This is because the outer ring 55 may need to press the tapes T onto a curved or uneven surface, as described above. In particular, when there is a dent having a curvature radius smaller than the diameter of each sub roller 51, insufficient elasticity of the outer ring 55 may cause a gap to arise between the outer ring 55 and the dent.

Therefore, it is preferable that the outer ring 55 is made of an elastic body which can deforms the outer ring 55 so as to fit an uneven surface when the outer ring 55 is pressed against the uneven surface, and then restore the shape of the outer ring 55 to its original shape when the outer ring 55 is pulled away from the uneven surface.

Thus, the outer ring 55 can consist of a wave-shaped second spring 58 whose phase direction is circular, as shown in FIG. 15. That is, the ring-shaped second spring 58 can be used as the elastic body forming the outer ring 55. Thereby, the ability of the outer ring 55 to follow a shape of a surface against which the tapes T are pressed can be improved. Specifically, not only the expansion and contraction of the inner first springs 57, but also the elastic deformation of the second spring 58 make it possible to easily fit the outer surface of the outer ring 55 to a curved or uneven surface.

Since the outer surfaces of the outer rings 55 apply pressure to the tapes T in the thickness direction while feeding the tapes T slidably in the width direction, it is preferable to make each outer surface of the outer rings 55 as close to a side surface of a cylinder as possible. That is, it is desirable to bring the outer surfaces of the outer rings 55 into line contact with the tapes T. Accordingly, the shape of each second spring 58 can be made a periodic one-dimensional waveform whose amplitude directions are the radial directions of the outer ring 55 and at least each crest side is a part of a cylinder, as shown in FIG. 15. In this case, when the outer ring 55 is rotated, the outer surface of the outer ring 55 can be intermittently brought into line contact with one or two of the tapes T since a part of a side surface of the cylinder and a slit whose length direction is in the rotation axis direction of the outer ring 55 alternately appear on the outer surface of the outer ring 55. For this reason, it is desirable to shorten the interval between the crests, forming the parts of the cylinder, of the second spring 58 as much as possible.

The outer ring 55 may not consist of the wave-shaped second spring 58, but may be made of non-corrugated cylindrical rubber having elasticity equivalent to that of the second spring 58. Nevertheless, in order to place the non-rubber first springs 57 inside the rubber outer ring 55, each of the first springs 57 needs to be coupled to the outer ring 55.

On the other hand, when the outer ring 55 is composed of the wave-shaped second spring 58, the material of the second spring 58 can be the same as the material of the first springs 57, and thereby the corrugated second spring 58 can be integrated with the radially disposed first springs 57. That is, each sub roller 51 having the outer ring 55, the first springs 57 and the inner ring 56 can be integrated so that joining can be avoided.

In particular, a resin, such as a polyamide or an ABS resin, can be used as a material for a 3D (three-dimensional) printer. Accordingly, when each sub roller 51 having the outer ring 55, the first springs 57 and the inner ring 56 is made of a resin that can be selected as a material for a 3D printer, each sub roller 51 can be integrally formed by 3D molding using a 3D printer.

Figure 16:
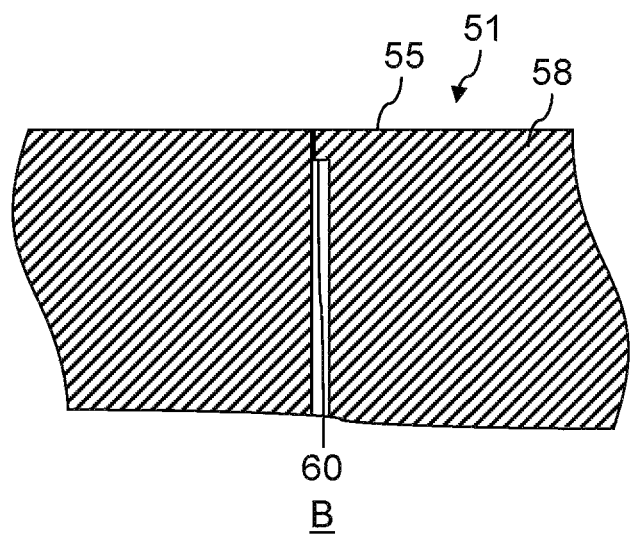
FIG. 16 is an enlarged longitudinal sectional view at the position B of the sub rollers shown in FIG. 14.

FIG. 16 is an enlarged longitudinal sectional view at the position B of the sub rollers 51 shown in FIG. 14.

As for the sub rollers 51 of the roller unit 50, it is also desirable to reduce the contact area between each adjacent sub rollers 51 so that all the sub rollers 51 can rotate at independent rotational speeds, similarly to the sub rollers 21 of the roller unit 20 shown in FIG. 4 and FIG. 5.

Accordingly, a step 60 or steps 60 can be formed in the outer ring 55 of each sub roller 51 so that the area of one end face of each sub roller 51, which may come into contact with the end face of the adjacent sub roller 51, may be reduced, as exemplified in FIG. 16. More specifically, the radial step 60 or the radial steps 60 can be formed in each of the outer rings 55 so that the thickness of each outer ring 55 may decrease toward the bearing 52 while keeping the shape of the outer surface or the shapes of the outer surfaces of each outer ring 55 from changing, as exemplified in FIG. 16. Note that, when the outer ring 55 is the wave-shaped second spring 58, it is considered sufficient to respectively form the steps 60 only on the end faces adjacent to the crests that may come into contact with the tape T or the tapes T.

Figure 17:
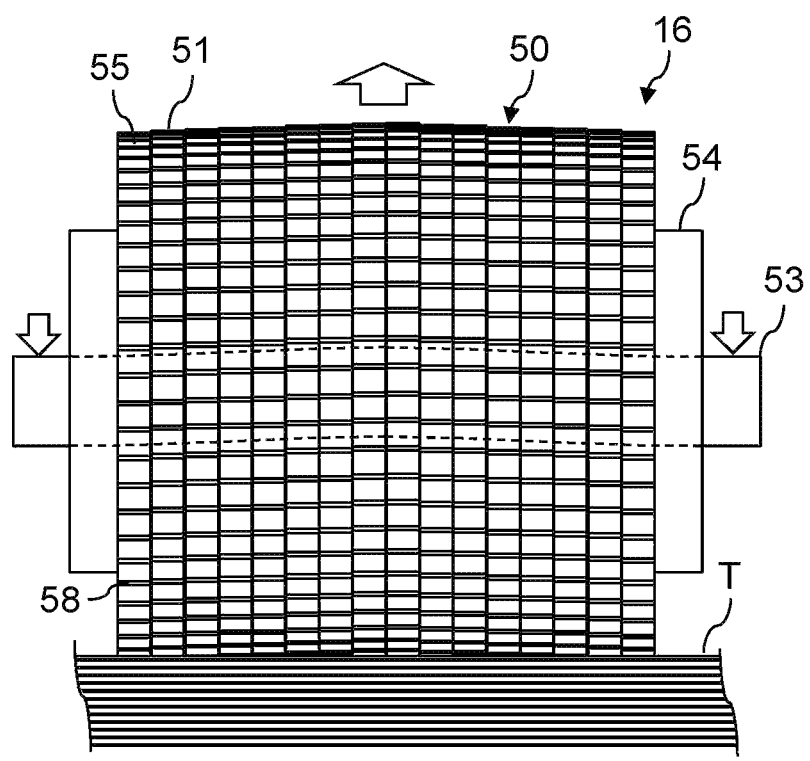
FIG. 17 is a front view of the roller unit showing an example in which each spring constant of the first springs disposed inside each sub roller shown in FIG. 15 is changed among the sub rollers.

FIG. 17 is a front view of the roller unit 50 showing an example in which each spring constant of the first springs 57 disposed inside each sub roller 51 shown in FIG. 15 is changed among the sub rollers 51.

When the roller unit 50 serving as the compaction roller 16 is pressed toward the lamination jig J, force toward the lamination jig J acts near both ends of the support shaft 53. Therefore, the vicinity of the center of the support shaft 53 may bend upward due to reaction force from the lamination jig J and the tapes T which have been laminated. In this case, when the sub rollers 51 have the same elasticity, the pressure applied from the compaction roller 16 to the tapes T may become uneven.

Accordingly, the spring constants of the first springs 57 disposed inside each sub roller 51 can be adjusted so that the pressure applied from the compaction roller 16 to the tapes T may be uniform even when the support shaft 53 bends upward due to the reaction force from the lamination jig J and the laminated tape T.

In this case, the spring constants of the first springs 57 are not constant among the sub rollers 51. Specifically, the spring constants of the first springs 57 disposed inside the central sub roller 51 are set relatively large so that the contraction lengths of the first springs 57 disposed inside the central sub roller 51 may relatively decrease. On the other hand, the spring constants of the first springs 57 disposed inside the sub rollers 51 on both sides are set relatively small so that the contraction lengths of the first springs 57 disposed inside the sub rollers 51 on both sides may not relatively decrease. When the sub rollers 51 are produced with a 3D printer, the spring constants of the first springs 57 can be easily changed by changing the thicknesses and/or lengths of the first springs 57.

As described above, in the second implementation, not only the roller unit 50 used as the compaction roller 16 is composed of the sub rollers 51 which can rotate at mutually independent rotational speeds, but also each sub roller 51 has elasticity.

(Effects)

According to the second implementation, an effect that it is possible to press the tapes T by the compaction roller 16 following the shape of a surface to which the tapes T should be pressed even when the surface is not flat is obtained in addition to an effect similar to that in the first implementation. That is, the compaction roller 16 can be deformed in accordance with the shape of the surface against which the tapes T are to be pressed while preventing the compaction roller 16 from crushing so that sufficient pressing force against the tapes T can be secured.

Accordingly, not only it becomes easy to laminate the tapes T along a curved line by steering lamination, but also it becomes possible to laminate the tapes T on a surface having a more complicated shape. As a result, the degree of freedom in an FRP design can be improved.

Figure 18:
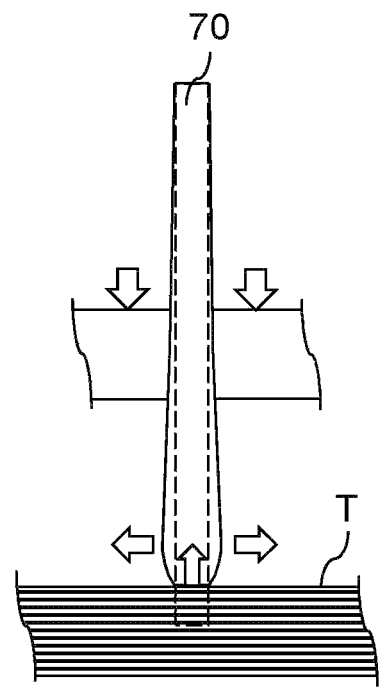
FIG. 18 is a view for explaining a problem in case of using a rubber roller in order to apply pressure to tapes.
Figure 19:
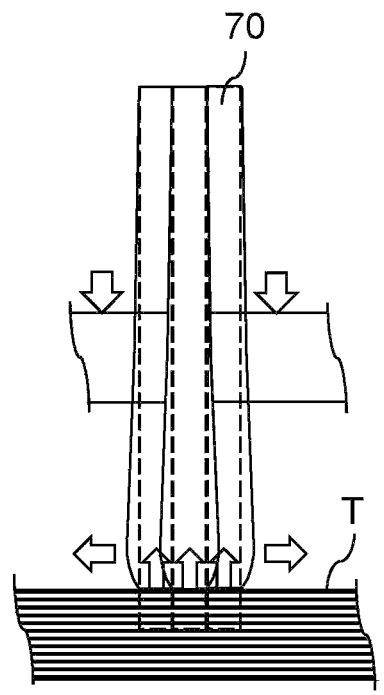
FIG. 19 is a view for explaining a problem in case of using the rubber rollers, disposed in the rotation axis direction, in order to apply pressure to tapes.

FIG. 18 is a view for explaining a problem in case of using a rubber roller 70 in order to apply pressure to tapes T. FIG. 19 is a view for explaining a problem in case of using the rubber rollers 70, disposed in the rotation axis direction, in order to apply pressure to tapes T.

When the thin rubber roller 70 like a roller having a thickness smaller than its diameter is pressed against the lamination jig J and the laminated tapes T, the rubber roller 70 is crushed by the pressure and then spreads laterally due to the Poisson effect as shown in FIG. 18. In addition, when pressure is applied to the tapes T with the thin rubber roller 70, the rubber roller 70 may buckle. That is, the rubber roller 70 may lose its elasticity and bend.

Therefore, when the thin rubber rollers 70 are disposed without gaps in the rotation axis direction as shown in FIG. 19, the rubber rollers 70 spread laterally due to the Poisson effect and thereby interfere with each other, which causes locking of the rubber rollers 70. As a result, the rubber rollers 70 cannot be rotated at independent rotational speeds.

Accordingly, the rubber rollers 70 cannot be used in order to give elasticity to the thin sub rollers 51 of the roller unit 50. That is, if the compaction roller 16 were made of rubber, the compaction roller 16 cannot be divided at a fine pitch in the rotation axis direction.

On the other hand, each sub roller 51 of the roller unit 50 has elasticity defined not as a Young's modulus of rubber but as spring constants determined according to the shapes of the first springs 57. Accordingly, even when pressure is applied to each sub roller 51 of the roller unit 50, the Poisson effect does not arise. As a result, even when the sub rollers 51, each having a thickness of 1 mm to 6 mm which is smaller than the diameter of the sub roller 51, are arrayed without gaps in the rotation axis direction, no locking arises among the sub rollers 51.

Accordingly, in case of the roller unit 50, the sub rollers 51 can be respectively rotated at rotational speeds independent from each other even when one or more of the sub rollers 51 are deformed in radial directions due to strong pressing force or being pressed against an undulating surface. As a result, it is possible to prevent the tapes T from deviating from a pathway during steering lamination, and thereby improve the lamination accuracy of the tapes T.

Figure 20:
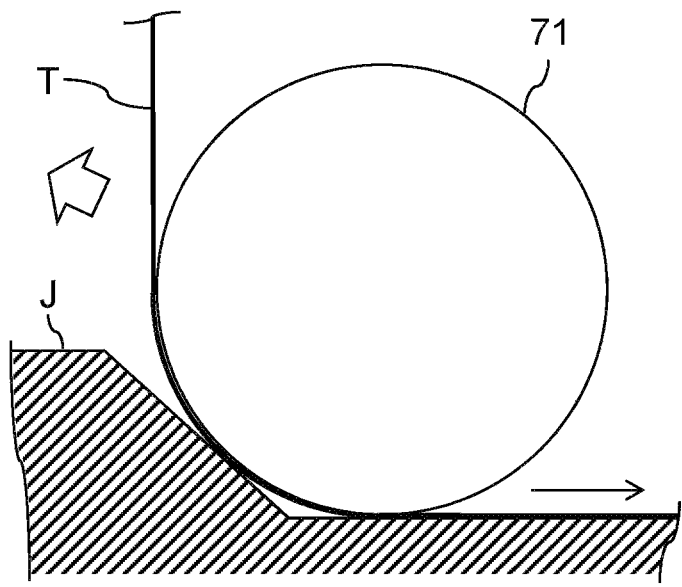
FIG. 20 is a view for explaining a problem in case of using a ring-shaped roller, which is not corrugated and has insufficient flexibility, in order to apply pressure to tapes.
Figure 21:
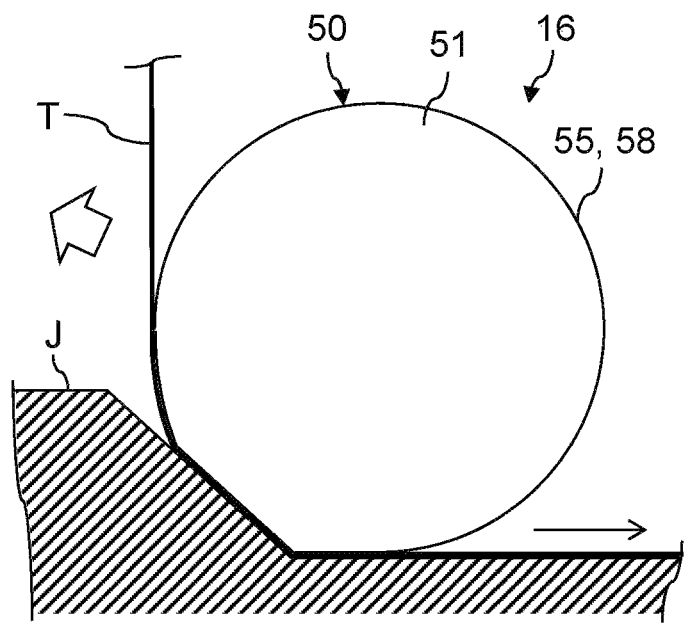
FIG. 21 is a view for explaining an effect of the roller unit having the sub rollers whose outer rings each consists of the second corrugated spring as shown in FIG. 15.

FIG. 20 is a view for explaining a problem in case of using a ring-shaped roller 71, which is not corrugated and has insufficient flexibility, in order to apply pressure to tapes T. FIG. 21 is a view for explaining an effect of the roller unit 50 having the sub rollers 51 whose outer rings 55 each consists of the second corrugated spring 58 as shown in FIG. 15.

When the tapes T are pressed, by the non-wavy ring-shaped roller 71 having insufficient flexibility, against a concave surface having a curvature radius smaller than the diameter of the ring-shaped roller 71, a gap is formed between the tapes T and the concave surface as shown in FIG. 20. That is, a gap in which the tapes T cannot be laminated is generated. Such a gap in the thickness direction of the tapes T leads to serious quality deterioration of an FRP after molding even when the gap is slight.

Therefore, merely replacing the rubber rollers 70 with non-rubber rings supported by springs from the insides in order to avoid the Poisson effect and buckling, which arise in case of using the rubber rollers 70, described with reference to FIG. 18 and FIG. 19 may not allow the tapes T to be laminated on a surface having a complicated uneven shape.

Conversely, in case of using the solid rubber rollers 70 as shown in FIG. 18 and FIG. 19, the Poisson effect and buckling arise as described above although it is possible to fit the rubber rollers 70 to a surface having a complicated concave-convex shape by using highly flexible rubber. Accordingly, not only the rubber rollers 70 cannot be disposed without gaps and rotated at independent rotational speeds, but also the rubber rollers 70 may be crushed due to pressing force when the tapes T are laminated.

On the other hand, when the outer ring 55 of each sub roller 51 is composed of the wave-shaped second spring 58 as shown in FIG. 15, the outer ring 55 itself can be made flexible. Specifically, each outer ring 55 can have elasticity in the radial directions of the outer ring 55 by the first springs 57 while each outer ring 55 can have elasticity in the traveling direction of the outer ring 55 by the second spring 58. That is, each sub roller 51 can be supported by the first springs 57 so that the sub rollers 51 are not crushed in the radial directions even when the sub rollers 51 are pressed against the tapes T, while ensuring followability to undulations, which may exist where the outer ring 55 travels, by the second spring 58.

Accordingly, for example, even when the tapes T are pressed against a concave surface having a radius of curvature smaller than the maximum diameter of the sub rollers 51 and the outer rings 55 as shown in FIG. 21, the outer rings 55 can be fit to the concave surface by elastic deformation of the second springs 58, serving as the outer rings 55 respectively, in planes including the traveling directions of the outer rings 55. As a result, the tapes T can be laminated without gaps onto the concave surface having the radius of curvature smaller than the maximum diameter of the sub rollers 51 and the outer rings 55.

Note that, a compaction roller having elasticity, in a plane perpendicular to the rotation axis, consisting of the elasticity of a non-wavy outer ring itself corresponding to the Young's modulus and the elasticity of the first springs 57 was actually prototyped, instead of composing each outer ring 55 of the wave-shaped second spring 58. Then, the tapes T were pressed against an uneven surface using the prototyped compaction roller. As a result, it was confirmed that a gap often arose between the tapes T and the uneven surface.

On the other hand, the tapes T were also pushed onto the uneven surface using the roller unit 50, having the outer rings 55 composed of the corrugated circular second springs 58 each supported from the inside by the first springs 57, as a test. As a result of the test, it was confirmed that the tapes T could be laminated without a gap between the tapes T and the uneven surface.

The second springs 58 serving as the outer rings 55 of the sub rollers 51 can elastically deform by independent deformation amounts among the sub rollers 51 respectively. Therefore, the roller unit 50 can be fit to even a surface having unevenness in the rotation axis direction of the sub rollers 51, not limited to the example shown in FIG. 21.

As described above, the roller unit 50 in the second implementation is not crushed by pressing force or contact with an undulating surface. In addition, the roller unit 50 in the second implementation fits to even a surface having large undulations and a complicated shape by deforming according to the shape of the surface.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although a case where each tape T to be laminated is a tape-shaped prepreg, which is fibers impregnated with resin, has been described in the above-mentioned implementation, each tape T may be tape-shaped fibers, which have not been impregnated with resin. A tape T made of fibers before being impregnated with resin is called a dry tape. A laminated body of dry tapes derived by laminating the dry tapes and shaping the laminated dry tapes according to a shape of an FRP is called a dry preform.

When a dry preform is used as a material for molding an FRP, the FRP is molded by the RTM method. Specifically, a process of impregnating fibers with uncured resin is performed by injecting the uncured resin into the dry preform, prior to the process of curing the resin.

As an example of device for widening the width of a dry tape, a fiber opening device disclosed in WO 2010/137525 pamphlet is known. Accordingly, the fiber opening device may be used as each of the width adjusting devices 11 when dry tapes are to be laminated by the fiber placement apparatus 1.

What is claimed is:

1. A roller unit for aligning tapes in a width direction and feeding the aligned tapes in a length direction while pressing the aligned tapes in a thickness direction, the tapes being made of fibers which have not been impregnated with resin or have been impregnated with the resin, the roller unit comprising:
rollers rotating by friction force between the tapes and the rollers when the rollers contact with the tapes, the rollers being aligned so that rotation axes of the rollers lie on a same straight line, maximum diameters of the rollers being same as each other; and
a support shaft supporting the rollers rotatably at rotational speeds independent from each other,
wherein each of the rollers includes springs and thereby has elasticity, length directions of the springs being radial directions of the each of the rollers, expansion and contraction directions of the springs being radial directions of the each of the rollers, the springs being radially disposed inside the each of the rollers, and
wherein the each of the rollers includes a ring forming an outer surface of the each of the rollers, the springs being disposed inside the ring, the ring consisting of a corrugated spring of which a phase direction is circular and of which amplitude directions are in radial directions of the each of the rollers.

2. The roller unit according to claim 1, wherein the ring is made of an elastic body which deforms the ring so as to fit a surface having unevenness when the ring is pressed against the surface having the unevenness, the elastic body restoring a deformed shape of the ring to an original undeformed shape when the ring is pulled away from the surface having the unevenness.

3. A fiber placement apparatus comprising:
the roller unit according to claim 2.

4. A method of molding a composite material comprising:
laminating the tapes by feeding the tapes using the roller unit according to claim 2; and curing the resin with which the tapes have been impregnated.

5. A fiber placement apparatus comprising:
the roller unit according to claim 1.

6. A method of molding a composite material comprising:
laminating the tapes by feeding the tapes using the roller unit according to claim 1; and
curing the resin with which the tapes have been impregnated.

7. The roller unit according to claim 1, wherein each roller further includes at least one radial step formed in the outer ring so that the thickness of each outer ring decreases in a radial out to radial inward direction.

8. The roller unit according to claim 1, wherein each roller includes an inner ring forming an interior surface supported by said support shaft, and wherein the springs having radial length directions are circumferentially spaced apart from each other as to define circumferential gaps between adjacent springs having radial length directions, and which circumferential gaps each extend radially for a full radial length between the inner ring and the outer ring.

9. A roller unit for aligning tapes in a width direction and feeding the aligned tapes in a length direction while pressing the aligned tapes in a thickness direction, the tapes being made of fibers which have not been impregnated with resin or have been impregnated with the resin,
the roller unit comprising:
rollers rotating by friction force between the tapes and the rollers when the rollers contact with the tapes, the rollers being aligned so that rotation axes of the rollers lie on a same straight line, maximum diameters of the rollers being same as each other; and
a support shaft supporting the rollers rotatably at rotational speeds independent from each other,
wherein each of the rollers includes springs and thereby has elasticity, length directions of the springs being radial directions of the each of the rollers, expansion and contraction directions of the springs being radial directions of the each of the rollers, the springs being radially disposed inside the each of the rollers,
wherein the springs having radial length directions are each comprised of a one-dimensional wavy spring whose phase direction is a radial direction of the roller, while amplitude direction of the wavy spring is perpendicular to both the radial direction and the rotation axis direction of the roller, and
wherein the springs having radial length directions each have amplitudes that increase in moving radially away from the rotation axis of the roller.

10. The roller unit according to claim 9, wherein each roller includes an outer ring forming an outer surface, the springs having radial length directions are disposed inside the outer ring, and wherein the outer ring is a wave shaped corrugated spring of which a phase direction is circular, the corrugated spring being integrated with the springs having radial length directions.

* * * * *